(12) United States Patent
Pandura

(10) Patent No.: US 7,584,526 B2
(45) Date of Patent: Sep. 8, 2009

(54) GRIP FOR A MOTOR VEHICLE

(75) Inventor: Michael Pandura, Weinsberg (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 539 days.

(21) Appl. No.: 11/449,842

(22) Filed: Jun. 9, 2006

(65) Prior Publication Data

US 2007/0018471 A1 Jan. 25, 2007

(30) Foreign Application Priority Data

Jun. 10, 2005 (DE) .................... 10 2005 026 836

(51) Int. Cl.
*B25G 1/10* (2006.01)

(52) U.S. Cl. .............. 16/436; 16/444; 16/412

(58) Field of Classification Search .......... 16/436, 16/430, 431, 412, 415, DIG. 40, DIG. 41 A, 16/444; 049/501, 502, 460; 296/153, 146.7, 296/146.1, 146.5, 1.02, 1.08

See application file for complete search history.

(56) References Cited

U.S. PATENT DOCUMENTS

| 2,146,415 | A | * | 2/1939 | Bradley ...................... 220/753 |
| 2,231,222 | A | * | 2/1941 | Rosenheimer, Jr. ......... 220/755 |
| 3,977,054 | A |  | 8/1976 | Moore et al. |
| 4,261,078 | A | * | 4/1981 | Edwards et al. ............... 16/409 |
| 4,340,990 | A | * | 7/1982 | Seynhaeve .................... 16/445 |
| 5,579,556 | A | * | 12/1996 | Chung ........................ 16/110.1 |
| 5,771,536 | A | * | 6/1998 | Sieg et al. ..................... 16/431 |
| 5,781,956 | A | * | 7/1998 | Kelsay et al. ............... 15/143.1 |
| 5,943,737 | A | * | 8/1999 | Tomimitsu et al. ........... 16/412 |
| 6,092,858 | A | * | 7/2000 | Bolwell .................... 296/146.7 |
| 6,247,204 | B1 | * | 6/2001 | Hamby et al. ................. 16/436 |
| 2002/0108213 | A1 | * | 8/2002 | Stegmaier .................... 16/430 |
| 2006/0064852 | A1 | * | 3/2006 | Willems ..................... 016/444 |

FOREIGN PATENT DOCUMENTS

| DE | 76 23 712 | 11/1976 |
| DE | 77 13 094 | 9/1977 |
| DE | 87 06 310.7 | 7/1987 |
| DE | 195 22 224 A1 | 8/1996 |
| DE | 299 20 776 U1 | 1/2000 |
| DE | 102 04 168 C2 | 8/2003 |
| FR | 1 225 785 | 7/1960 |
| FR | 1 562 374 | 4/1969 |
| JP | 2001-219775 A | 8/2001 |

OTHER PUBLICATIONS

European Search Report dated Sep. 28, 2006 with English translation of relevant portion (Four (4) Pages).

* cited by examiner

*Primary Examiner*—Chuck Y. Mah

(57) ABSTRACT

A grip consists of two grip shells which can be connected with one another by gluing and in which a supporting carrier is arranged. The supporting carrier has connection elements on the end side for a fastening to a vehicle structure.

16 Claims, 3 Drawing Sheets

GRIP FOR A MOTOR VEHICLE

BACKGROUND AND SUMMARY OF THE INVENTION

The present invention relates to a grip for a motor vehicle consisting of two half shells which can be connected with one another and have a supporting carrier situated on the inside, and the holding grip can be connected particularly with a transmission tunnel of the motor vehicle or with a vehicle structure.

FR 15 62 374 discloses a grip in which a reinforcing core is embedded. Furthermore, a grip consisting of two shell bodies is described in DE 76 23 712 U, in which the shell bodies can be assembled and are connected with one another by projections and indentations arranged on the joining surface and mutually engaging in the manner of snap fasteners. In addition, DE 87 06 310 U1 discloses a roof holding grip consisting of two shells which can be assembled, in which case one shell comprises a hook on a connecting edge, which hook can be fitted into a slot at the opposite connecting edge of the other shell.

An object of the present invention is to provide a holding grip for a motor vehicle which can easily be produced and assembled, has a stable construction and has fastening possibilities on a vehicle component, for example, on a transmission tunnel of the vehicle body.

According to the invention, this object is achieved by providing that a supporting carrier is arranged between the two semicircular grip shells made of plastic, which supporting carrier has an I-shaped profile in its cross-section and, at one free end, has a connection element with fastening bores which projects from the grip shells and, at its other end facing away from this connection element, has a sleeve-type other connection element which is arranged inside the grip shell and has a threaded bore for a screwing device for a fastening to the vehicle structure.

Among the principal advantages achieved by way of the holding grip formed of two plastic shells are that an inserted metallic core or a core consisting of a plastic material forms a supporting carrier which provides the grip with an optimal stability, prevents a bending due to a load and can be fastened in a simple manner.

According to the present invention, this is essentially achieved in that a, for example, metallic supporting carrier is arranged between the two semicircular grip shells made of plastic. In its cross-section, this supporting carrier consists of an I-section and is provided with a connection element of an angular cross-section which projects out of the grip shells and has fastening bores. On its other free end, a sleeve-type other connection element is provided which is molded on, is arranged inside the grip shells and is provided with a threaded bore for a screwing device for a fastening to the vehicle.

Preferably, the supporting carrier consisting of an I-section points with its flanges to the connecting edges of the grip shells, and a web of the I-section extends in a common plane with the connecting edges, and the interior surfaces of the grip shells are supported on the front edges of the flanges. On one hand, this arrangement simplifies the assembly of the two grip shells and, on the other hand, the continuous supporting carrier with end-side fastening possibilities permits a stable linkage to the vehicle structure; in this particular case, to a transmission tunnel of the vehicle.

Furthermore, for a simple connection of the supporting carrier with a grip shell, it is provided according to the invention that at least one welding dome or a catch is arranged on an interior surface of a grip shell, on which the supporting carrier is fastened by hot-riveting. As a result, the supporting carrier can easily be firmly connected with one grip shell, so that no relative displacement can take place between the supporting carrier and the grip shells. For the precise mutual fixing of the grip shells, one grip shell according to the present invention has at least one centering bush on the interior surface of one grip shell with a centering pin of the other grip shell being fitted into the centering bush for aligning the two grip shells with respect to one another.

According to the invention, the connection of the holding grip takes place such that the sleeve-type connection element of the supporting carrier is arranged to fill out the space between the two grip shells, and an insertion piece with a threaded bore is held between webs of the connection element. Furthermore, the projecting connection element of the supporting carrier has at least one continuous bore for a fastening screw which extends transversely to the grip in the installed position, and the connection element as well as screws are covered by way of a cap adjoining the grip shell. As a result of this construction of the two free ends of the supporting carrier with connection elements, fastenings can be implemented which are easy to produce and maximal forces acting upon the grip can be absorbed without the possibility that the grip may detach from the vehicle structure when it is subjected to a load.

BRIEF DESCRIPTION OF THE DRAWINGS

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

DETAILED DESCRIPTION OF THE DRAWINGS

Figure 1:
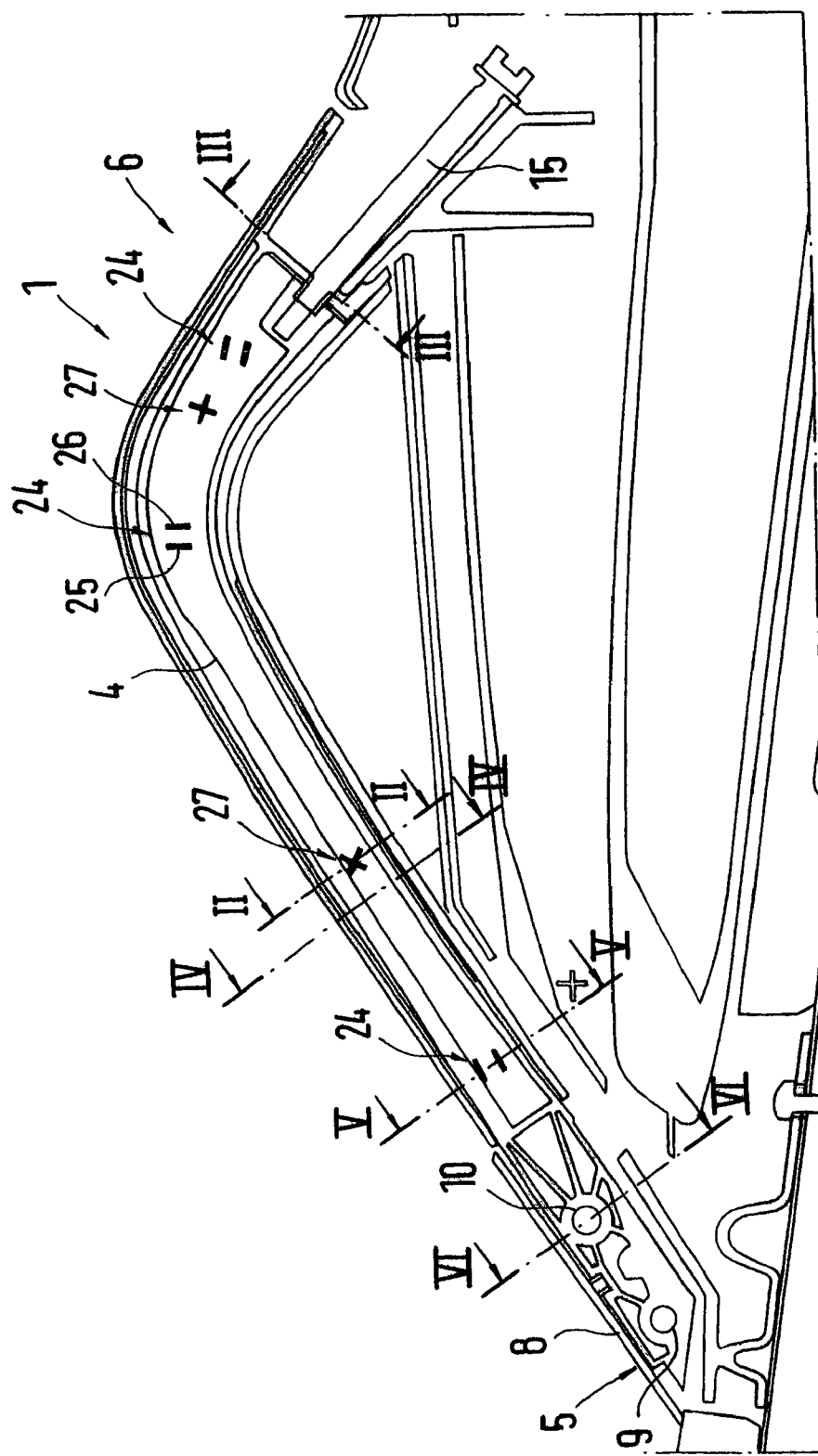
FIG. 1 is a view of a grip shell with an inserted supporting carrier.

The holding grip 1 comprises two semicircular grip shells 2, 3 mutually connected, for example, by a gluing-together or locking-together. A supporting carrier 4, which in its cross-section consists of an I-profile, is arranged in an embedded manner inside these grip shells 2, 3 and which in each case has connection elements 5, 6 on the end side for a fastening to the vehicle structure.

The connection elements 5, 6 are constructed in one piece with the supporting carrier 4. Connection element 5 extends out of the grip shells 2, 3 in a bare manner or exposed and is covered by a shell 8. This connection element 5 has, for example, a square cross-section and has at least two transversely extending bores 9, 10 which extend to the grip 1 and accommodate the fastening screws 11 which can be connected with the vehicle structure 12.

Figure 3:
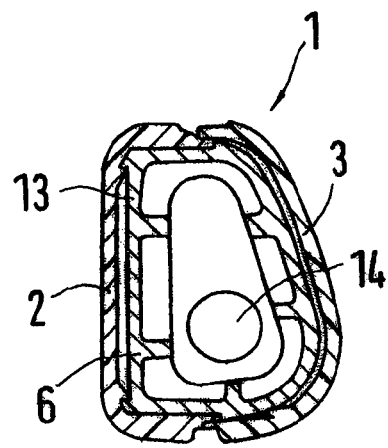
FIG. 3 is a sectional view along line III-III of FIG. 1 of the holding grip in the area of an end-side connection element.
Figure 4:
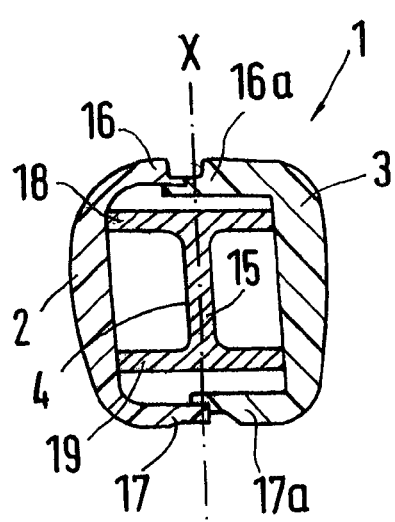
FIG. 4 is a sectional view along line IV-IV of FIG. 1 of the grip shell and the supporting carrier.

The additional connection element 6 consists of a sleeve-shaped receiving element 13 which is arranged to be embedded in the two grip shells 2, 3. In the connection element 6, a receiving bore 14 (FIG. 3) for a fastening screw (15) is arranged which establishes a fixed connection to the vehicle structure.

The profile of the supporting carrier 4 is situated with its web 15 in a common plane X-X with abutting connection edges 16, 16*a*. The grip shells 2, 3 are supported on front edges of the flanges 18, 19 of the profile.

Figure 7:
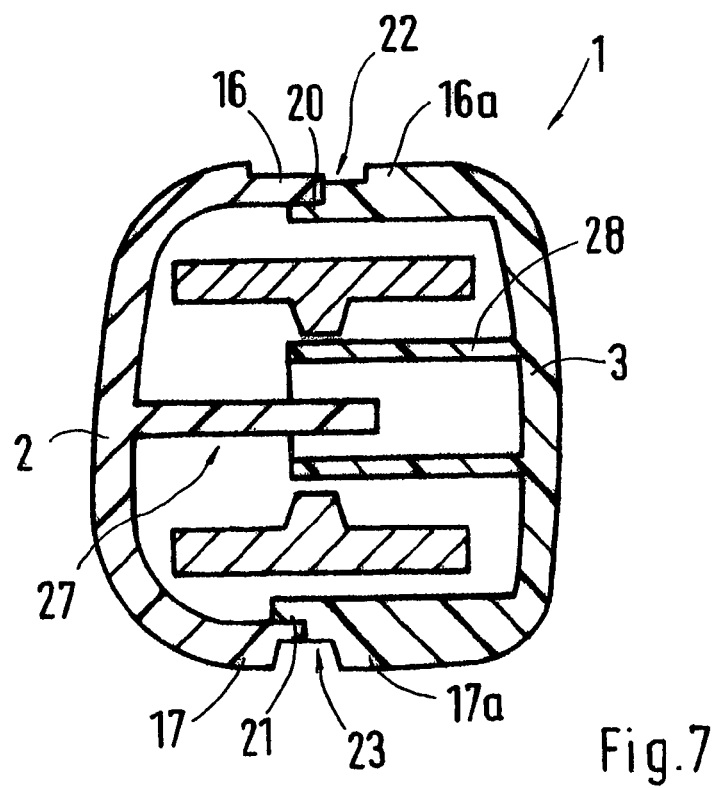
FIG. 7 is an enlarged representation of the connecting edges of the grip shells with indentations.

The connecting edges 16, 16*a* and 17, 17*a* of the grip shells 2, 3 are arranged to be mutually overlapping. The connecting edges 16*a*, 17*a* of grip shell 16 have a shoulder 20, 21 into which the opposite connecting edges 16, 17 are inserted. As seen in FIG. 7, one indentation 22, 23 respectively is formed in the connection area of the edges 16, 16*a* and 17, 17*a*, and a seam of a covering made of leather or another material for the grip 1 is situated in the indentation 22, 23. The other material may be a fabric, a foil, a leather imitation or the like.

Figure 5:
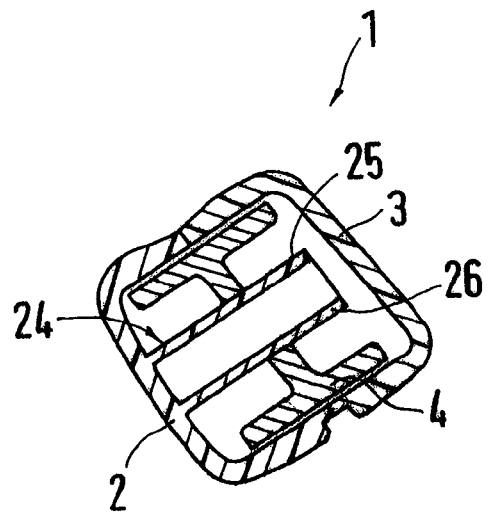
FIG. 5 is a sectional view along line V-V of FIG. 1 of the holding grip in the area of a hot connection point of the supporting carrier.
Figure 6:
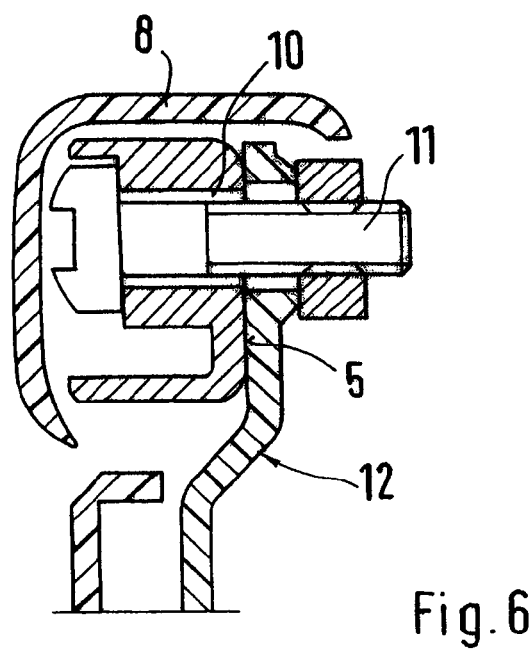
FIG. 6 is a sectional view along line VI-VI of FIG. 1 of the holding grip in the area of an end-side connection of the supporting carrier with the vehicle.

The supporting carrier 4 can be fixed on a grip shell 2, 3 by a welding dome 24 (FIG. 5) which is hot-riveted for this purpose. The welding dome 24 comprises, for example, two spaced ribs 25 and 26.

Figure 2:
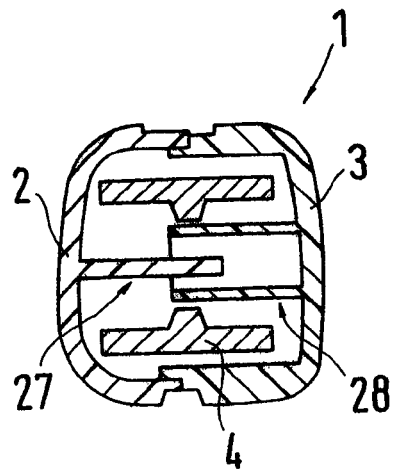
FIG. 2 is a sectional view along line II-II of FIG. 1 of the holding grip in the area of a centering pin.

For fixing the two grip shells 2, 3 with respect to one another, centering pins 27 (FIG. 2) with a cross-shaped cross-section are provided on one grip shell 2 or 3 and can each be fitted into a centering bush 28 to hold the two grip shells 2, 3 in a predetermined connection position with respect to one another. The grip shells 2, 3 can be provided with a covering of leather or another covering.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A holding grip for a motor vehicle, comprising:
two half shells which are connectable with one another and have an interiorly situated supporting carrier with the holding grip being connectable with a vehicle structure, wherein that the supporting carrier is arranged between the two plastic half shells and the two half shells have cross sections which are substantially semicircular, the supporting carrier having an I-shaped cross-sectional profile and, at one free end thereof, said supporting carrier has a projecting connection element with fastening bores which project from the shells and, at another end thereof facing away from the connection element, has a further connection element arranged inside the shells and has a threaded bore for receiving a screwing device which fasten to the vehicle structure.

2. The holding grip according to claim 1, wherein:
the two half shells each have connection edges; and
the I-shaped cross-section of the supporting carrier has flanges facing towards the connection edges of the shells, a web of the I-shaped cross-section extends in a common plane with the connecting edges, and interior surfaces of the shells are supported on edges of the flanges.

3. The holding grip according to claim 1, wherein the vehicle structure is a transmission tunnel.

4. The holding grip according to claim 2, wherein the connecting edges are arranged to overlap such that the connecting edges of one of the shells have a shoulder in which opposite connecting edges of the other of the shells are arranged, and the shells are mutually connected in an area of the connecting edges with each having an indentation for receiving a covering seam.

5. The holding grip according to claim 1, wherein at least one welding dome is arranged on an interior surface of one of said two half shells and upon which the supporting carrier is hot-rivetingly fastened.

6. The holding grip according to claim 1, wherein at least one centering bush is molded to an interior surface of one of the shells, and a centering pin of the other of the shells is insertable into the centering bush mutual alignment of the shells.

7. The holding grip according to claim 6, wherein the centering pin has the cross-shaped cross-section.

8. The holding grip according to claim 1, wherein the further connection element is arranged so to fill out a space between the two shells, and an insertion part with a threaded bore is held between webs of the further connection element.

9. The holding grip according to claim 1, wherein the projecting connection element has at least the two continuous bores for fastening screws which extend transversely to the holding grip in its installed position, and the projecting connection element and the screws are covered by a cap adjoining the shells.

10. The holding grip according to claim 4, wherein at least one welding dome is arranged on an interior surface of one of said two half shells and upon which the supporting carrier is hot-rivetingly fastened.

11. The holding grip according to claim 4, wherein at least one centering bush is molded to an interior surface of one of the shells, and a centering pin of the other of the shells is insertable into the centering bush mutual alignment of the shells.

12. The holding grip according to claim 11, wherein the centering pin has the cross-shaped cross-section.

13. The holding grip according to claim 4, wherein the further connection element is arranged so to fill out a space between the two shells, and an insertion part with a threaded bore is held between webs of the sleeve-type connection element.

14. The holding grip according to claim 4, wherein the projecting connection element has at least the two continuous bores for fastening screws which extend transversely to the holding grip in its installed position, and the projecting connection element and the screws are covered by a cap adjoining the shells.

15. The holding grip according to claim 7, wherein the further connection element is arranged so to fill out a space between the two shells, and an insertion part with a threaded bore is held between webs of the further connection element.

16. The holding grip according to claim 15, wherein the projecting connection element has at least the two continuous bores for fastening screws which extend transversely to the holding grip in its installed position, and the projecting connection element and the screws are covered by a cap adjoining the shells.

* * * * *